(12) United States Patent
Sakai

(10) Patent No.: US 7,663,787 B2
(45) Date of Patent: Feb. 16, 2010

(54) DOCUMENT DECIDING APPARATUS, DOCUMENT READING APPARATUS, IMAGE FORMING APPARATUS AND DOCUMENT DECIDING METHOD

(75) Inventor: Norikazu Sakai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 797 days.

(21) Appl. No.: 11/372,208

(22) Filed: Mar. 10, 2006

(65) Prior Publication Data

US 2007/0115517 A1   May 24, 2007

(30) Foreign Application Priority Data

Nov. 18, 2005   (JP)   ............... 2005-333835

(51) Int. Cl.
*H04N 1/46* (2006.01)
(52) U.S. Cl. ...................... 358/509; 358/520
(58) Field of Classification Search .................. 358/2.1, 358/509, 520, 517, 518, 505; 355/408; 356/381; 209/580; 396/205
See application file for complete search history.

(56) References Cited

U.S. PATENT DOCUMENTS

| | | | | |
|---|---|---|---|---|
| 5,926,560 A | * | 7/1999 | Ichinose et al. | 382/162 |
| 5,991,046 A | * | 11/1999 | Shakespeare et al. | 356/429 |
| 6,040,923 A | * | 3/2000 | Takashimizu et al. | 358/498 |
| 6,195,170 B1 | * | 2/2001 | Mizutani et al. | 358/1.14 |
| 6,232,997 B1 | * | 5/2001 | Nakamura et al. | 347/232 |
| 6,461,061 B2 | * | 10/2002 | Corbin et al. | 396/567 |
| 6,529,269 B1 | * | 3/2003 | Sugata | 356/71 |
| 6,806,981 B1 | * | 10/2004 | Konno | 358/505 |
| 7,182,976 B2 | * | 2/2007 | Takahashi et al. | 427/164 |
| 7,216,946 B2 | * | 5/2007 | Yamamoto et al. | 347/6 |

FOREIGN PATENT DOCUMENTS

JP        A 2003-250054        9/2003

* cited by examiner

*Primary Examiner*—Jerome Grant, II
(74) *Attorney, Agent, or Firm*—Oliff & Berridge, PLC

(57) ABSTRACT

A document deciding apparatus includes: a light source; a light-quantity detection unit detecting a reference light quantity based on irradiation of the light source, and respective light quantities of plural colors based on reflection from or transmission through a document; a decision unit deciding whether the document is colorless or colored, in accordance with a predetermined criterion on the basis of the light quantities of plural colors detected by the light-quantity detection unit; and a control unit performing a control so as to alter the criterion of the decision unit or a value corresponding to the light quantities detected by the light-quantity detection unit, on the basis of a change of the reference light quantity detected by the light-quantity detection unit.

23 Claims, 17 Drawing Sheets

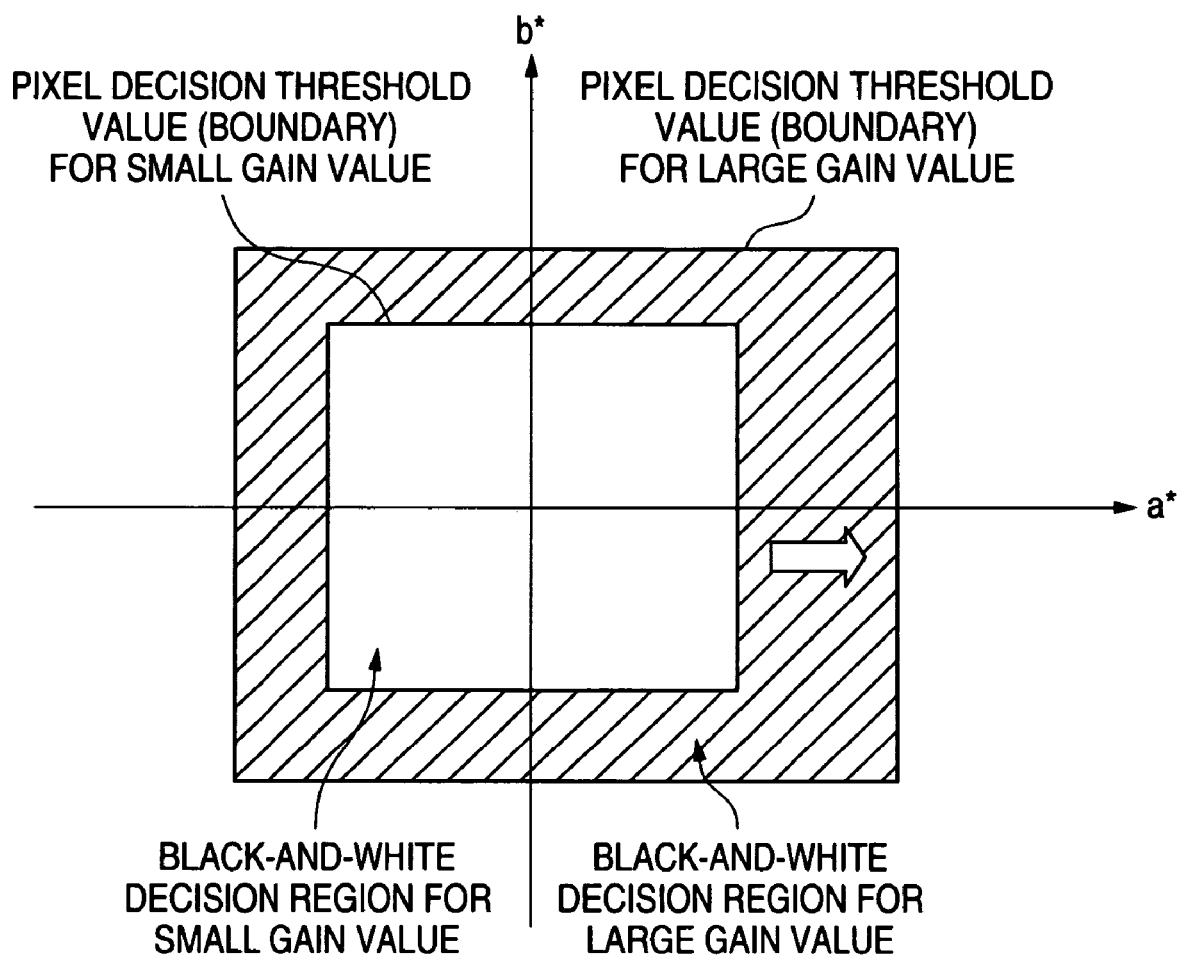

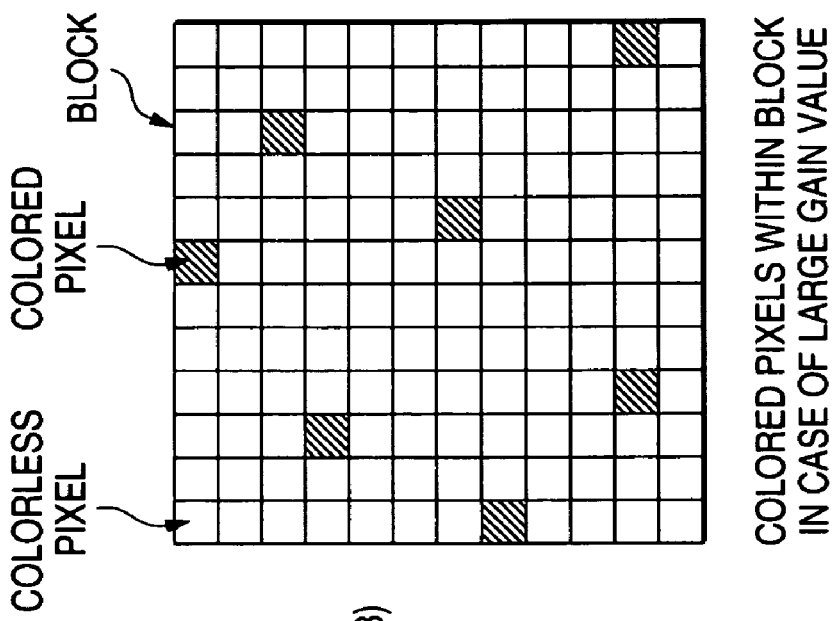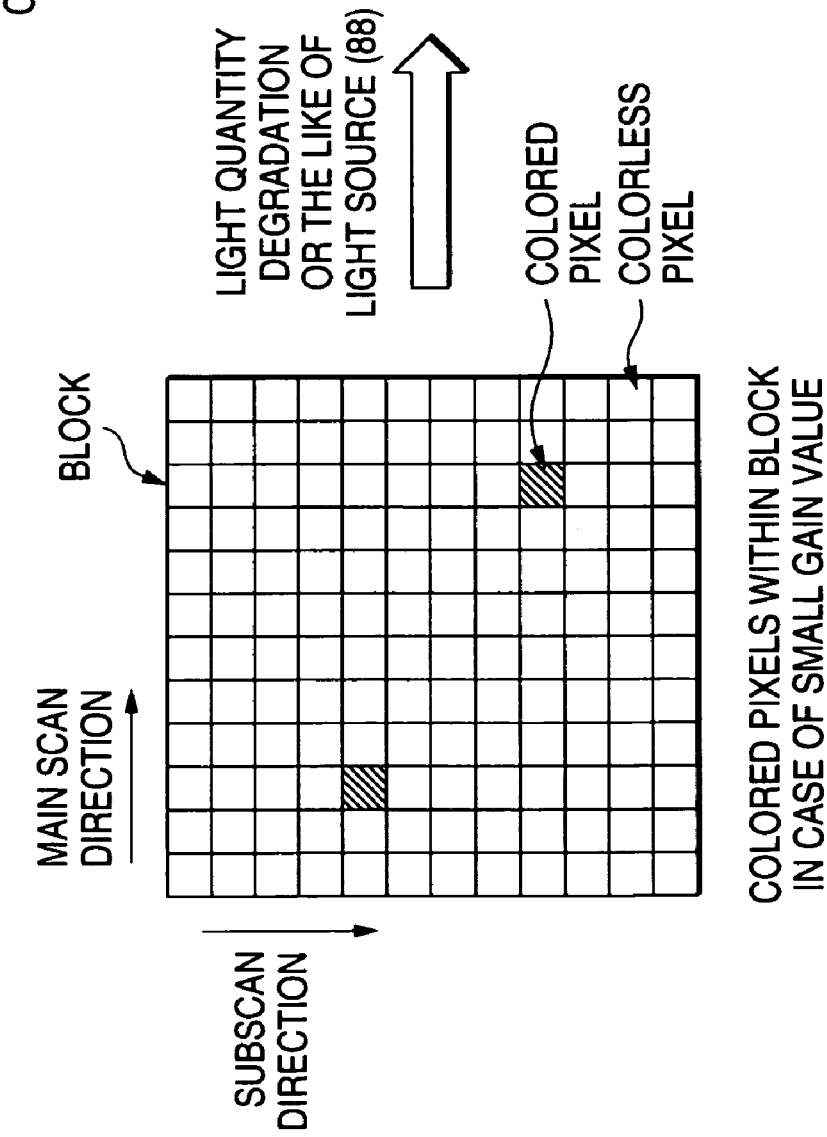
FIG. 8B — COLORED PIXELS WITHIN BLOCK IN CASE OF LARGE GAIN VALUE
FIG. 8A — COLORED PIXELS WITHIN BLOCK IN CASE OF SMALL GAIN VALUE

FIG. 9B

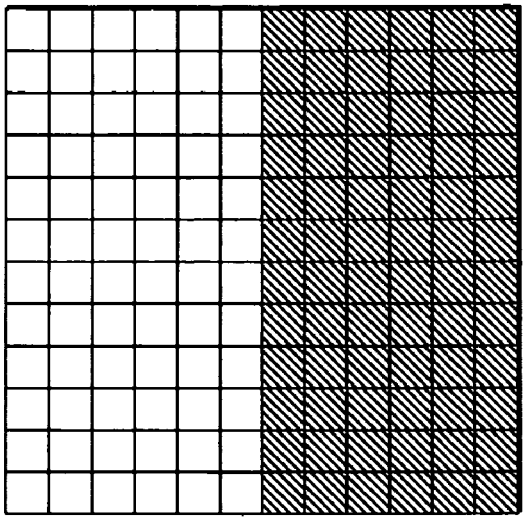

(EXAMPLE IN WHICH NUMBER-OF-COLORED-PIXELS DECISION THRESHOLD VALUE IS 72 IN BLOCK OF 12 PIXELS × 12 PIXELS)

NUMBER-OF-COLORED-PIXELS DECISION THRESHOLD VALUE WITHIN BLOCK IN CASE OF LARGE GAIN VALUE

LIGHT QUANTITY DEGRADATION OR THE LIKE OF LIGHT SOURCE (88) ↑

FIG. 9A

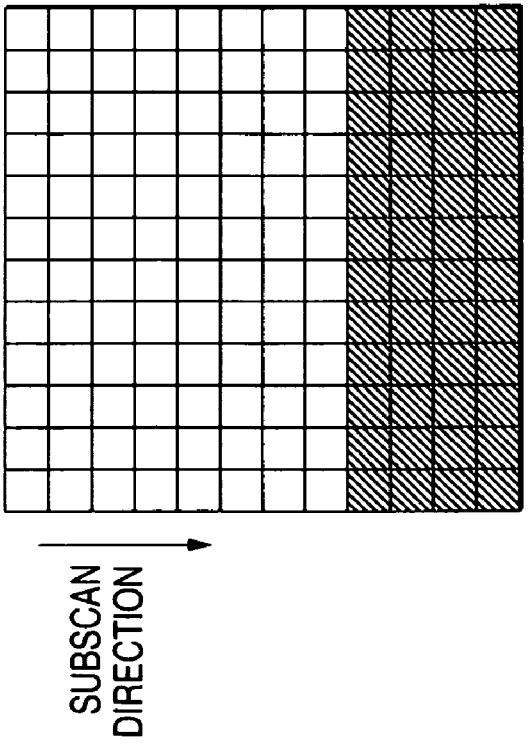

(EXAMPLE IN WHICH NUMBER-OF-COLORED-PIXELS DECISION THRESHOLD VALUE IS 48 IN BLOCK OF 12 PIXELS × 12 PIXELS)

MAIN SCAN DIRECTION ↑
SUBSCAN DIRECTION →

NUMBER-OF-COLORED-PIXELS DECISION THRESHOLD VALUE WITHIN BLOCK IN CASE OF SMALL GAIN VALUE

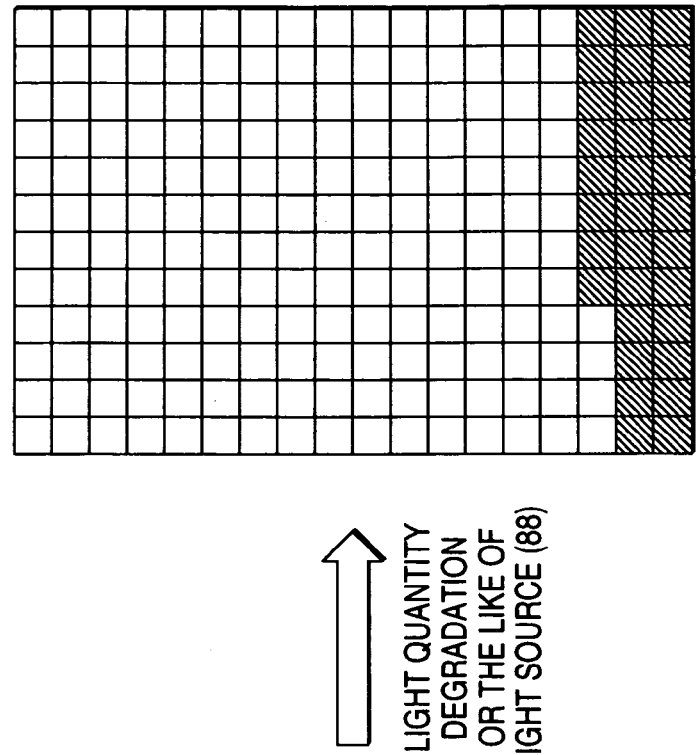

FIG. 11B
(EXAMPLE IN WHICH DOCUMENT DECISION THRESHOLD VALUE IS 32 IN DOCUMENT OF 216 BLOCKS)

DOCUMENT DECISION THRESHOLD VALUE IN CASE OF LARGE GAIN VALUE

↑ LIGHT QUANTITY DEGRADATION OR THE LIKE OF LIGHT SOURCE (88)

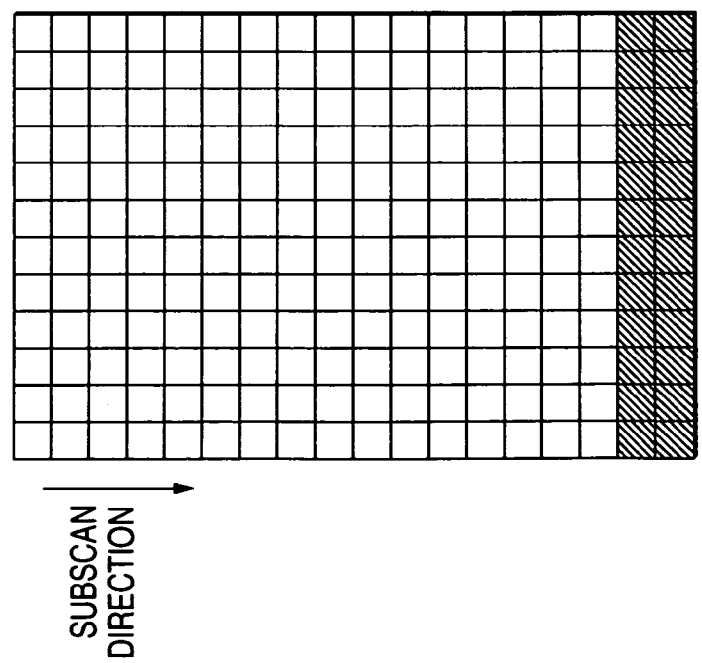

FIG. 11A
(EXAMPLE IN WHICH DOCUMENT DECISION THRESHOLD VALUE IS 24 IN DOCUMENT OF 216 BLOCKS)

MAIN SCAN DIRECTION
SUBSCAN DIRECTION

DOCUMENT DECISION THRESHOLD VALUE IN CASE OF SMALL GAIN VALUE

DOCUMENT DECIDING APPARATUS, DOCUMENT READING APPARATUS, IMAGE FORMING APPARATUS AND DOCUMENT DECIDING METHOD

CROSS-REFERENCE TO RELATED APPLICATIONS

This application is based on and claims the benefit of priority from the prior Japanese Patent Application No. 2005-333835, filed on Nov. 18, 2005; the entire contents of which are incorporated herein by reference.

TECHNICAL FIELD

The present invention relates to, for example, a document deciding apparatus, a document reading apparatus, an image forming apparatus and a document deciding method which decide whether a document is colorless or colored.

BACKGROUND

An image processing apparatus identifies whether a document is a color one or a black-and-white one, in such a way that a light of a lamp is projected onto the document and that reflected light from the document is read by a color CCD.

SUMMARY

According to an aspect of the invention, a document deciding apparatus includes: a light source; a light-quantity detection unit detecting a reference light quantity based on irradiation of the light source, and respective light quantities of plural colors based on reflection from or transmission through a document; a decision unit deciding whether the document is colorless or colored, in accordance with a predetermined criterion on the basis of the light quantities of plural colors detected by the light-quantity detection unit; and a control unit performing a control so as to alter the criterion of the decision unit or a value corresponding to the light quantities detected by the light-quantity detection unit, on the basis of a change of the reference light quantity detected by the light-quantity detection unit.

BRIEF DESCRIPTION OF THE DRAWINGS

These and other objects and advantages of this invention will become more fully apparent from the following detailed description taken with the accompanying drawings in which:

FIGS. 5A and 5B are graphs exemplifying auto gain adjustments which an analog correction portion performs, wherein FIG. 5A shows a gain before the light quantity degradation or the like of a light source occurs, while FIG. 5B shows a gain after the light quantity degradation or the like of the light source has occurred;

FIG. 7 is a graph showing pixel decision threshold values which are used in cases where a pixel decision portion decides whether a pixel is colorless or colored;

FIGS. 8A and 8B show decided results of individual pixels as are inputted from the pixel decision portion to a block decision portion, with respect to an identical block in an identical document in a case where the analog correction portion changes a gain value, wherein FIG. 8A shows the decided results before an occurrence of the light quantity degradation or the like of the light source, while FIG. 8B shows decided results after the occurrence of the light quantity degradation or the like of the light source;

FIGS. 9A and 9B are model diagrams exemplifying number-of-colored-pixels decision threshold values which are used in cases where a block decision portion decides whether each block is colorless or colored, wherein FIG. 9A shows the number-of-colored-pixels decision threshold value before the occurrence of the light quantity degradation or the like of the light source, while FIG. 9B shows the number-of-colored-pixels decision threshold value after the occurrence of the light quantity degradation or the like of the light source;

FIGS. 10A and 10B show decided results of individual blocks as are inputted from the block decision portion to a document decision portion, with respect to the identical document in the case where the analog correction portion changes the gain value, wherein FIG. 10A shows the decided results before the occurrence of the light quantity degradation or the like of the light source, while FIG. 10B shows the decided results after the occurrence of the light quantity degradation or the like of the light source;

FIGS. 11A and 11B are model diagrams exemplifying document decision threshold values which are used in cases where the document decision portion decides whether the document is colorless or colored, wherein FIG. 11A shows the document decision threshold value before the occurrence of the light quantity degradation or the like of the light source, while FIG. 11B shows the document decision threshold value after the occurrence of the light quantity degradation or the like of the light source;

DETAILED DESCRIPTION

Embodiments will be described in conjunction with the drawings.

Figure 1:
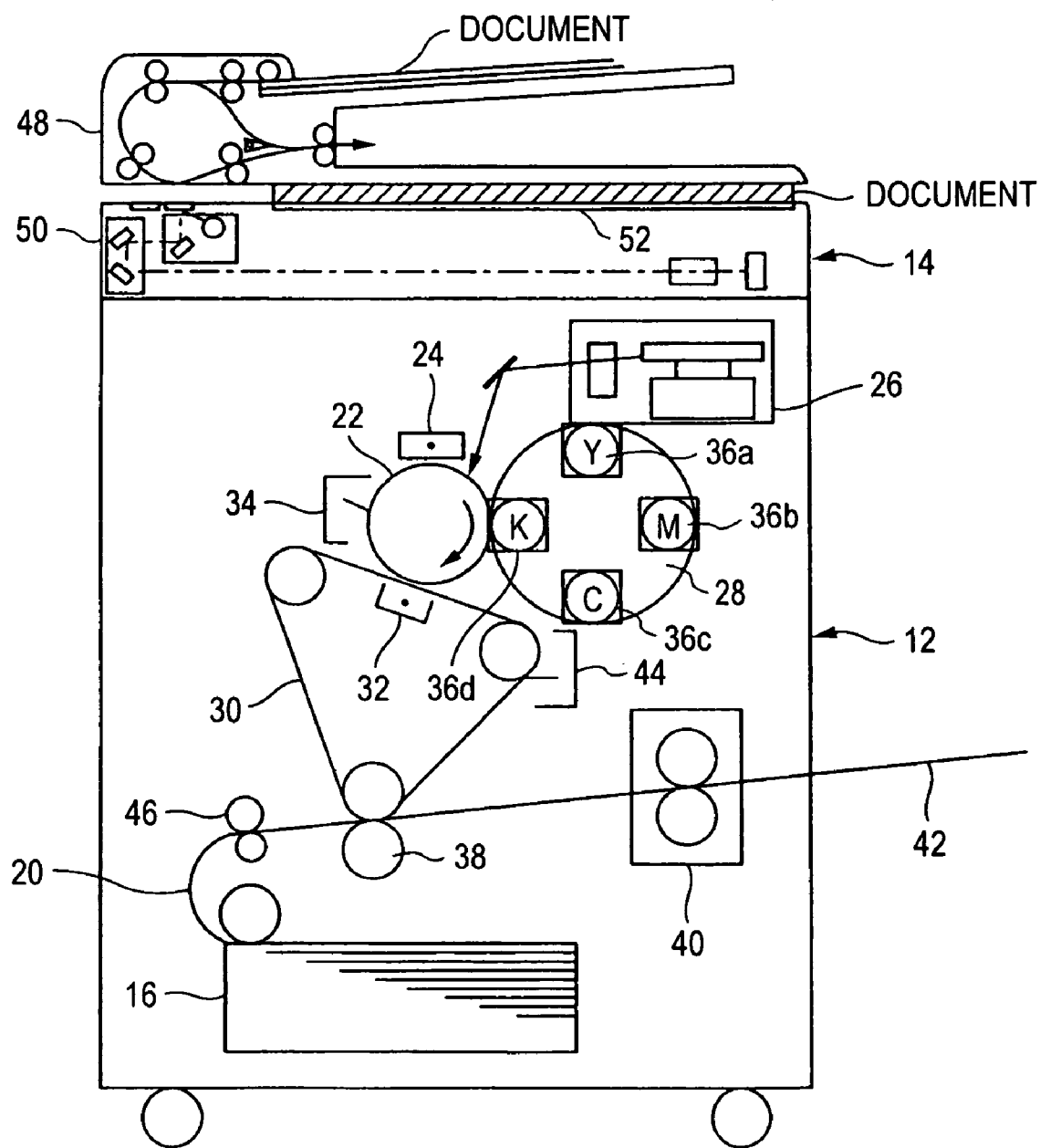
FIG. 1 is a side view showing an outline of an image forming apparatus according to an embodiment.

Shown in FIG. 1 is an outline of an image forming apparatus 10. The image forming apparatus 10 is for color use by example, and it includes an image formation section 12 and a document reading apparatus 14. The image formation section 12 is of, for example, xerography scheme, it includes a paper feed tray 16 in which sheets are stacked, and it forms an image on the sheet which has been fed from the paper feed tray 16 to a sheet conveyance path 20.

More specifically, the image formation section 12 includes a photosensitive drum 22, a charger 24 which uniformly charges the photosensitive drum 22, an exposure device 26 which forms a latent image on the photosensitive drum 22 uniformly charged by the charger 24, a development device 28 which visualizes with toners, the latent image on the photosensitive drum 22 as has been formed by the exposure device 26, a primary transfer device 32 which transfers the toner images formed by the development device 28, onto an intermediate transfer belt 30, and a photosensitive-drum cleaner 34 which removes the toners remaining on the photosensitive drum 22. The exposure device 26 is of, for example, laser scan scheme, and it changes the image of a document read by the photoelectric transducer 86 of the document reading apparatus 14 as will be stated later, into the ON/OFF signals of a laser and outputs these ON/OFF signals. The development device 28 is of, for example, rotary type, in which development units 36a, 36b, 36c and 36d of four colors Y (yellow), M (magenta), C (cyan) and K (black) are circumferentially arranged, and in which they are respectively rotated so as to confront the photosensitive drum 22 when the images of the corresponding colors are developed. The primary transfer device 32 is constructed of, for example, a corotron, and the toner images of the four colors are transferred onto the intermediate transfer belt 30 by the transfer device 32. The toner images transferred on the intermediate transfer belt 30 is transferred onto the sheet by a secondary transfer device 38. The sheet bearing the toner images is delivered to a fixation device 40, and the toner images are fixed onto the sheet by the fixation device 40. The sheet on which the toner images have been fixed is ejected onto an ejection tray 42. The toners remaining on the intermediate transfer belt 30 is scraped off by an intermediate-transfer-belt cleaner 44.

Besides, when an operation mode (ACS mode: Auto Color Selection mode) in which the image forming apparatus 10 decides whether the document is colorless or colored is selected through a user interface not shown, the image formation section 12 forms, for example, a black-and-white image or the color image on the sheet in accordance with a result decided by the document reading apparatus 14 as to whether the document is colorless or colored.

Registration rolls 46 are arranged along the sheet conveyance path 20. The registration rolls 46 are controlled so as to temporarily stop the fed sheet, and to feed the sheet to the secondary transfer device 38 in synchronism with a timing at which the toner images are formed on the intermediate transfer belt 30.

The document reading apparatus 14 includes an automatic document feed device 48, and an optical system 50 which optically reads the document. This document reading apparatus 14 has the function of roughly reading the document fed by the automatic document feed device 48, and the function of reading the document placed on a platen glass plate 52.

Figure 2:
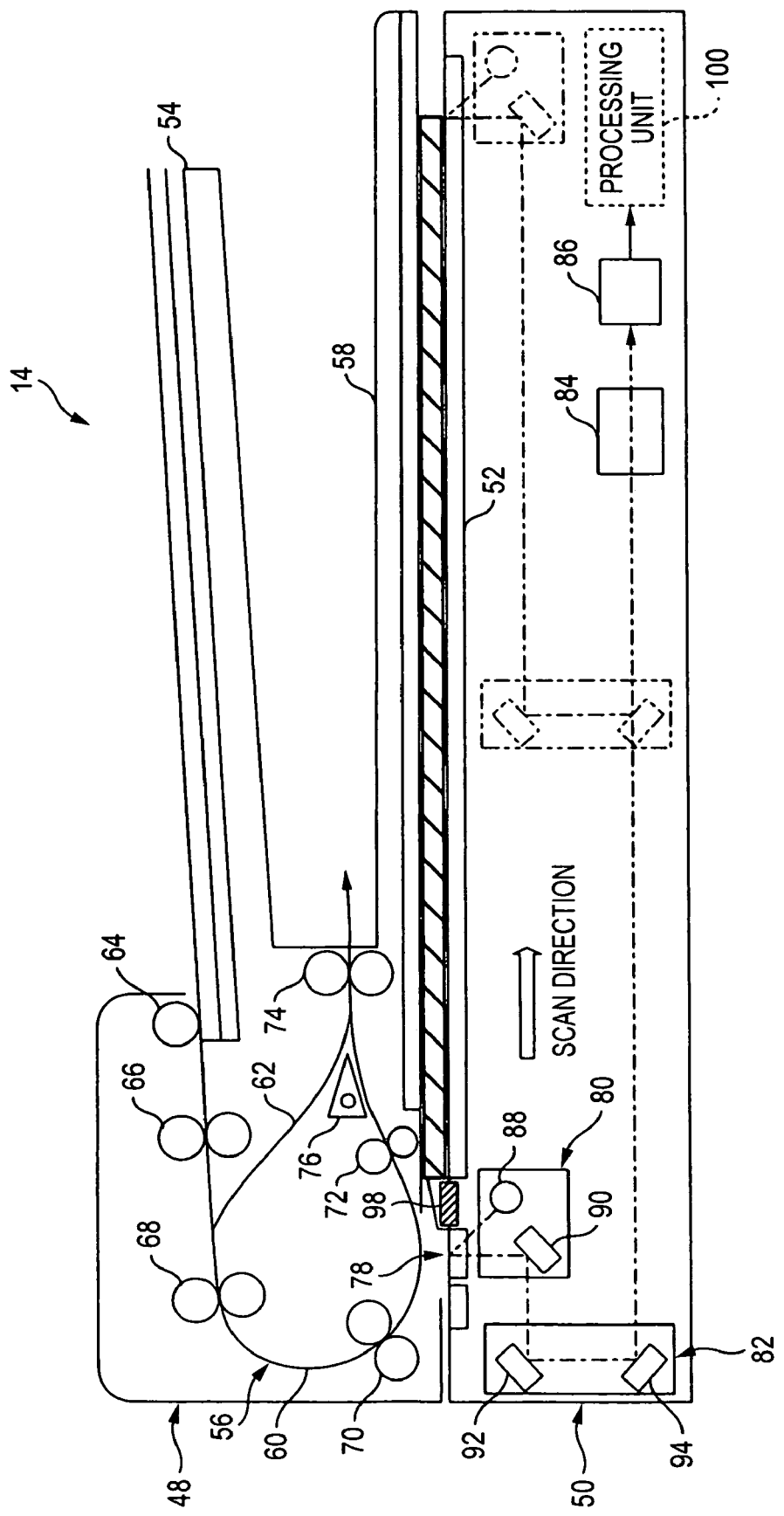
FIG. 2 is a side view showing details of a document reading apparatus according to the embodiment.

Shown in FIG. 2 is the details of the document reading apparatus 14.

The automatic document feed device 48 includes a platen 54 on which a large number of documents are placed, a document conveyance path 56 along which the document is conveyed, and an ejection bed 58 onto which the document having had its image read is ejected. The document conveyance path 56 includes a main conveyance portion 60 and a reversal portion 62. The main conveyance portion 60 is formed in the shape of letter U, and it is provided with a pickup roll 64, feed rolls 66, preregistration rolls 68, registration rolls 70, out-rolls 72 and ejection rolls 74 which constitute a conveyance device. In feeding the document, the pickup roll 64 descends and picks up the documents placed on the platen 54. The feed rolls 66 separate the documents delivered from the pickup roll 64, and feed only the uppermost document. The preregistration rolls 68 temporarily stop the document delivered from the feed rolls 66, and form a loop so as to correct oblique traveling. The registration rolls 70 temporarily stop the document delivered from the preregistration rolls 68, so as to establish a read timing. In case of ejecting the document, the ejection rolls 74 are rotated forward, and the document is ejected onto the ejection bed 58 through the out-rolls 72 as well as the ejection rolls 74.

The reversal portion 62 has one end connected to the main conveyance portion 60 between the out-rolls 72 and the ejection rolls 74, while it has the other end connected to the main conveyance portion 60 by the preregistration rolls 68. A reversing gate 76 is disposed near one end of the reversal portion 62. In case of reversing the document, the ejection rolls 74 are rotated reversely at a stage at which the rear end of the document has arrived near these ejection rolls 74, and the reversing gate 76 is located down, thereby to guide the document to the reversal portion 62. The reversing gate 76 may be opened by the thrust of the document and closed by its own weight, or an actuator for opening and closing the reversing gate 76 may well be disposed.

A conveyance document reading position 78 is set between the registration rolls 70 and the out-rolls 72, and the optical system 50 reads the document fed by the automatic document feed device 48, at the conveyance document reading position 78.

The optical system 50 includes a full-rate carriage 80, a half-rate carriage 82, a lens 84 and the photoelectric transducer 86. The full-rate carriage 80 includes a light source 88 and a first mirror 90. With a scan direction being the subscan direction of the document (rightward from the left as viewed in FIG. 2), the full-rate carriage 80 moves over a full stroke in the scan direction within the document reading apparatus 14.

Figure 3:
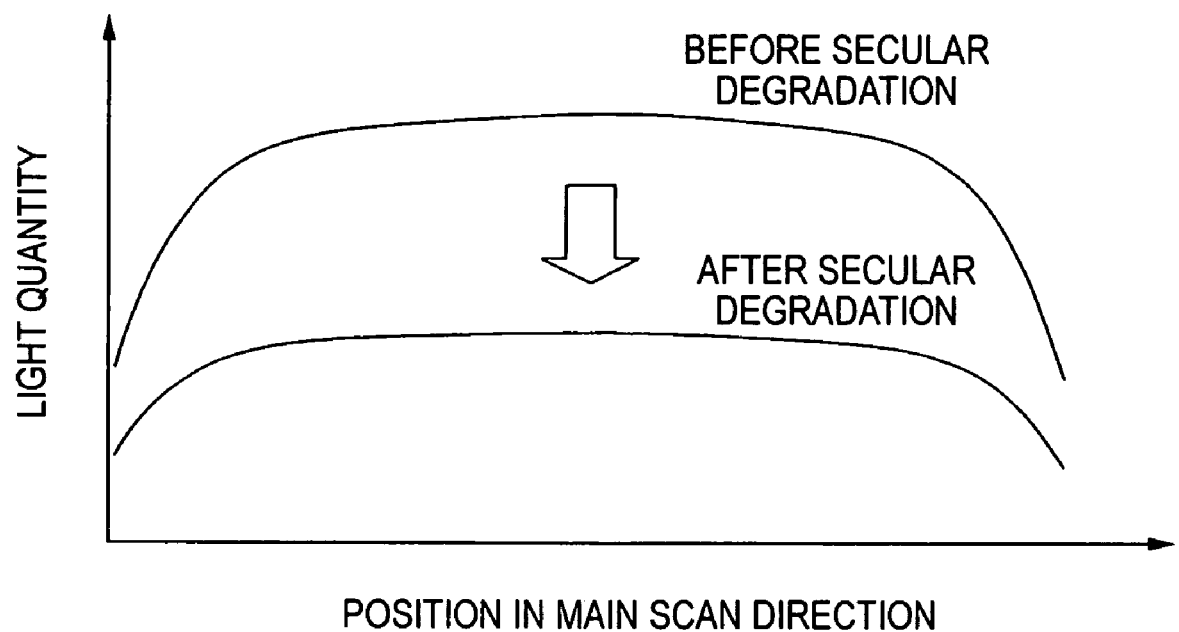
FIG. 3 is a graph showing light quantity characteristics of a light source.

The light source 88 is a lamp of, for example, halogen or xenon as extends in the main scan direction of the document. As shown in FIG. 3, the light source 88 has the characteristics that the light quantity of this light source is smaller at each end part thereof than at the middle part thereof in the main scan direction, and that the light quantity decreases entirely due to secular degradation. The half-rate carriage 82 includes a second mirror 92 and a third mirror 94, and it moves over a half stroke in the subscan direction within the document reading apparatus 14.

The light source 88 projects light onto the document which is placed on the platen glass plate 52 disposed over the moving ranges of the full-rate carriage 80 and the half-rate carriage 82, or the document which passes through the conveyance document reading position 78. In this regard, the lens 84 accepts the reflected light of the projected light through the first mirror 90, second mirror 92 and third mirror 94 so as to focus the reflected light.

The photoelectric transducer 86 is, for example, a 3-line color CCD which receives the reflected light at the focused position of this reflected light as based on the lens 84. The 3-line color CCD is configured of photodiodes which are respectively provided with filters of, for example, R (red), G (green) and B (blue) (primary color filters), and from which analog electric signals corresponding to the light quantities of the respective colors R, G and B in pixel units are outputted to a processing unit 100 to be explained later.

Besides, a reference white plate 98 which reflects the light projected by the light source 88 is disposed in the vicinity of the conveyance document reading position 78. The reflective surface of the reference white plate 98 for reflecting the light is tinged with a reference white color. The photoelectric transducer 86 can receive the reflected light of the light which the light source 88 has projected onto the reference white plate 98 (reference light quantity light) through the first mirror 90, second mirror 92, third mirror 94 and lens 84.

In a case where the document reading apparatus 14 reads the document placed on the platen glass plate 52, the full-rate carriage 80 and the half-rate carriage 82 are respectively moved in the scan direction while the light source 88 is projecting the light toward the document, whereby the photoelectric transducer 86 successively receives the rays of the reflected light corresponding to the whole surface of the document.

Besides, the photoelectric transducer 86 receives the reflected light of the light which the light source 88 has projected onto the reference white plate 98 at a predetermined timing.

Figure 4:
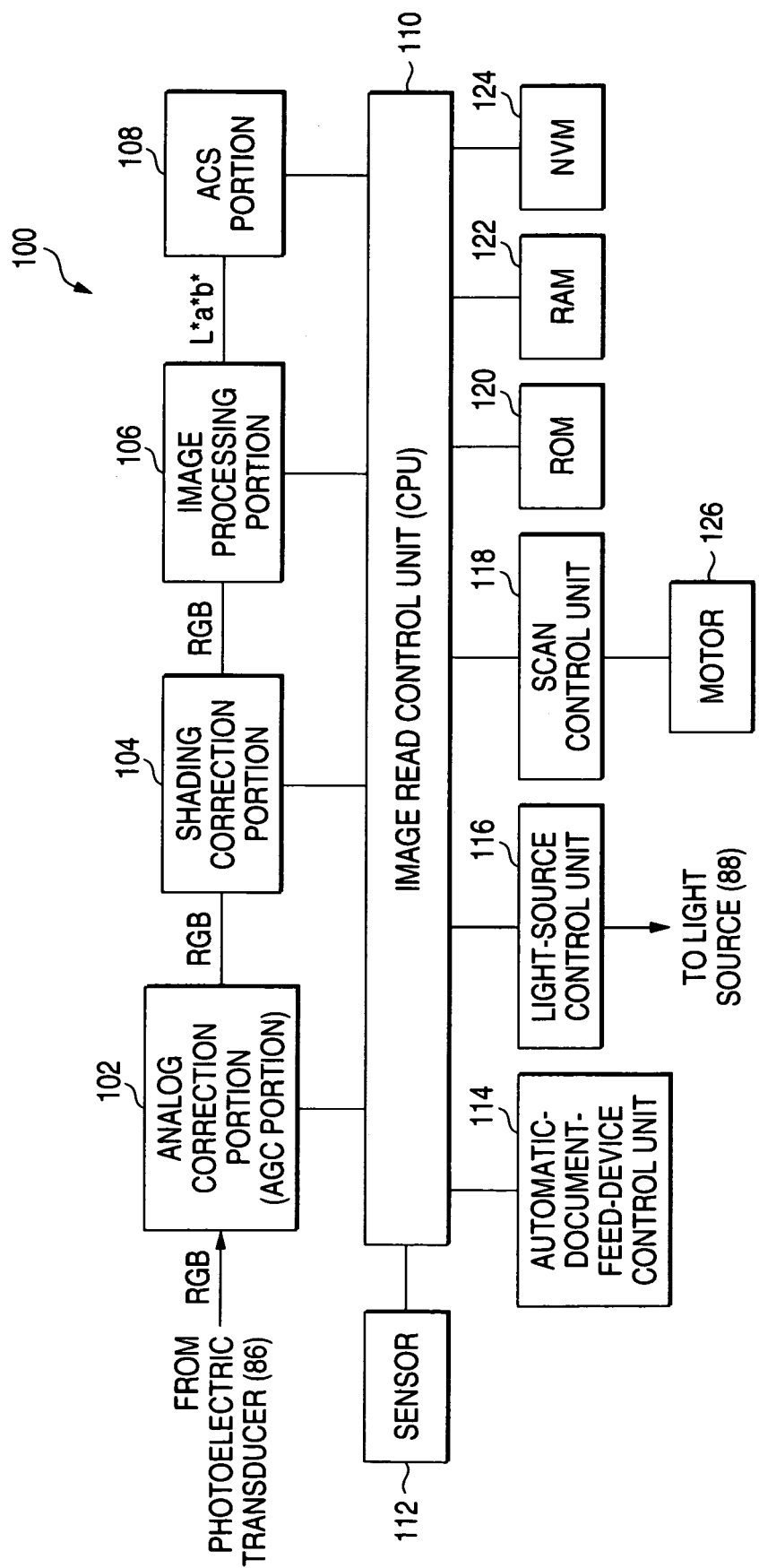
FIG. 4 is a block diagram showing outlines of a processing unit which processes RGB electric signals outputted by a photoelectric transducer, and the surroundings thereof.

FIG. 4 is a block diagram showing the outlines of the processing unit 100 which processes the RGB electric signals outputted by the photoelectric transducer 86, and the surroundings thereof.

As shown in FIG. 4, the processing unit 100 includes an analog correction portion 102, a shading correction portion 104, an image processing portion 106 and an ACS (Auto Color Selection) portion 108, and it is controlled by an image read control unit 110 which includes a CPU.

The analog correction portion 102 includes an auto gain control portion (AGC portion), and it performs processes such as auto gain adjustments and auto offset adjustments, for the respective analog electric signals inputted from the photoelectric transducer 86. Further, the analog correction portion 102 subjects the resulting analog signals to A/D conversions so as to output adjusted digital RGB signals to the shading correction portion 104. Besides, the analog correction portion 102 makes the gain adjustments in accordance with the light quantities of the reflected light based on the reference white plate 98, immediately after the turn-ON of a power source or after a prescribed time period since the turn-ON of the power source. The gain adjustments are made for the individual colors of the electric signals so that the signal levels of the respective analog electric signals inputted from the photoelectric transducer 86 which has received the reflected light based on the reference white plate 98 may become predetermined values. The adjusted gain values are outputted to the image read control unit 110.

Figure 5:
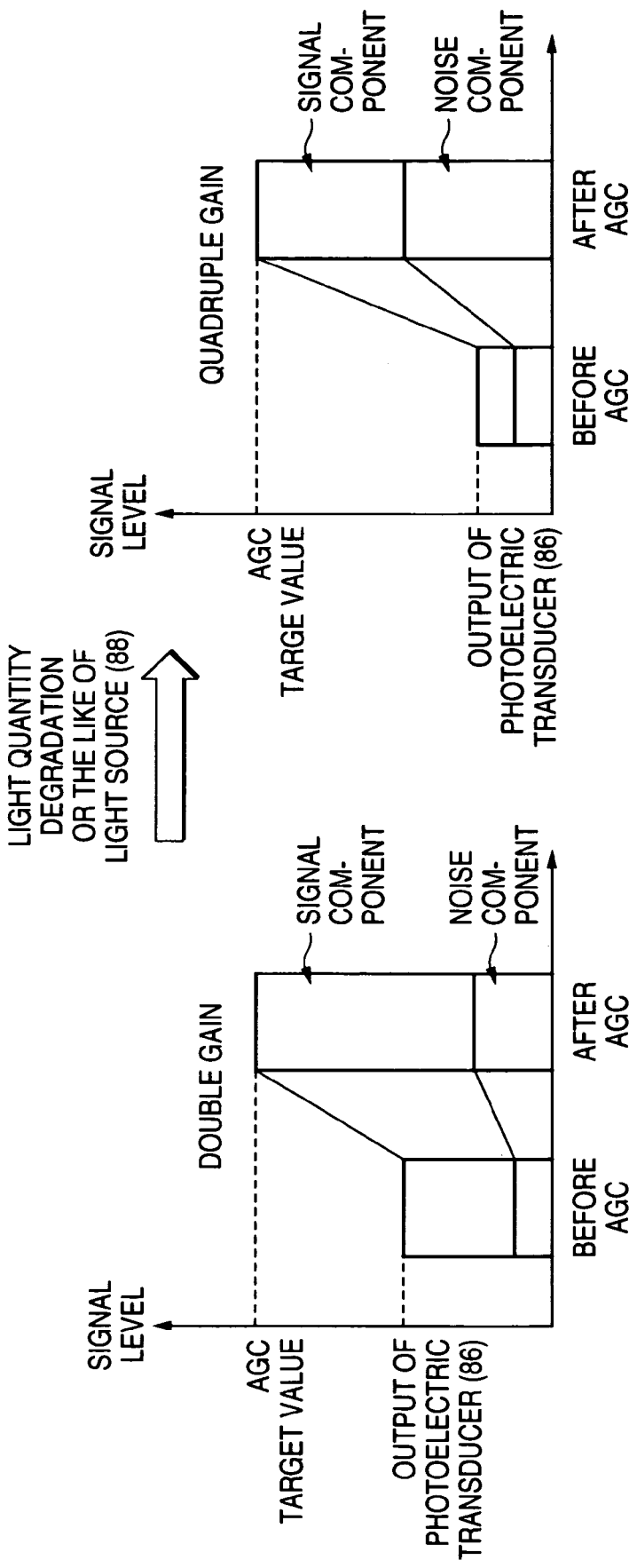

FIGS. 5A and 5B are graphs exemplifying the auto gain adjustments which the analog correction portion 102 performs, wherein FIG. 5A shows a gain before the light quantity degradation or the like of the light source 88 occurs, while FIG. 5B shows a gain after the light quantity degradation or the like of the light source 88 has occurred.

As seen from FIGS. 5A and 5B, the analog correction portion 102 is set so that each signal level outputted by the photoelectric transducer 86 may be amplified, for example, double before the light quantity degradation or the like of the light source 88 occurs. Besides, the analog correction portion 102 amplifies each signal level outputted by the photoelectric transducer 86 to, for example, the quadruple so as to be brought to a predetermined AGC target value, after the light quantity degradation or the like of the light source 88 has occurred. Here, even when the signal level outputted by the photoelectric transducer 86 has lowered due to the occurrence of the light quantity degradation or the like of the light source 88, substantially the same noise component as before the occurrence of the light quantity degradation or the like of the light source 88 is contained in the signal outputted by the photoelectric transducer 86, and hence, the analog correction portion 102 amplifies also the noise component of the RGB signal to the quadruple.

The shading correction portion 104 performs shading corrections for the RGB signals inputted from the analog correction portion 102, and outputs the resulting signals to the image processing portion 106. The image processing portion 106 performs a process in which the RGB signals inputted from the shading correction portion 104 are converted into image data of, for example, L*a*b* color representation system, an arithmetic process to be explained later, etc., and it outputs the resulting signals to the ACS portion 108.

The ACS portion 108 accepts the image data of the L*a*b* color representation system from the image processing portion 106 and analyzes the image data by a process as explained later, thereby to decide whether the document is colorless or colored. The result of the decision is outputted to the image read control unit 110.

Besides, the image read control unit 110 controls a sensor 112, an automatic-document-feed-device control unit 114, a light-source control unit 116, a scan control unit 118, a ROM 120, a RAM 122 and an NVM (Non-Volatile Memory) 124.

The sensor 112 is configured of a group of sensors which include, for example, a sensor for sensing the existence or nonexistence of the document. The automatic-document-feed-device control unit 114 controls the automatic document feed device 48. The light-source control unit 116 controls the light source 88. The scan control unit 118 controls a motor 126, thereby to control the movements of the full-rate carriage 80 and the half-rate carriage 82 in the subscan direction of the document (the scan direction of the carriages). The ROM 120 stores therein programs for operating the CPU which is included in the image read control unit 110. The RAM 122 stores therein the gain values accepted from the analog correction portion 102 by the image read control unit 110, predetermined set values, image data, etc. The NVM 124 stores therein, for example, the initial values of the gain values of the analog correction portion 102, gain threshold values "0"-"3" to be explained later, gain threshold value ratios "0" and "1", ASC decision parameters "0"-"4" and filter coefficients "0"-"2".

Next, the ACS portion 108 will be detailed.

Figure 6:
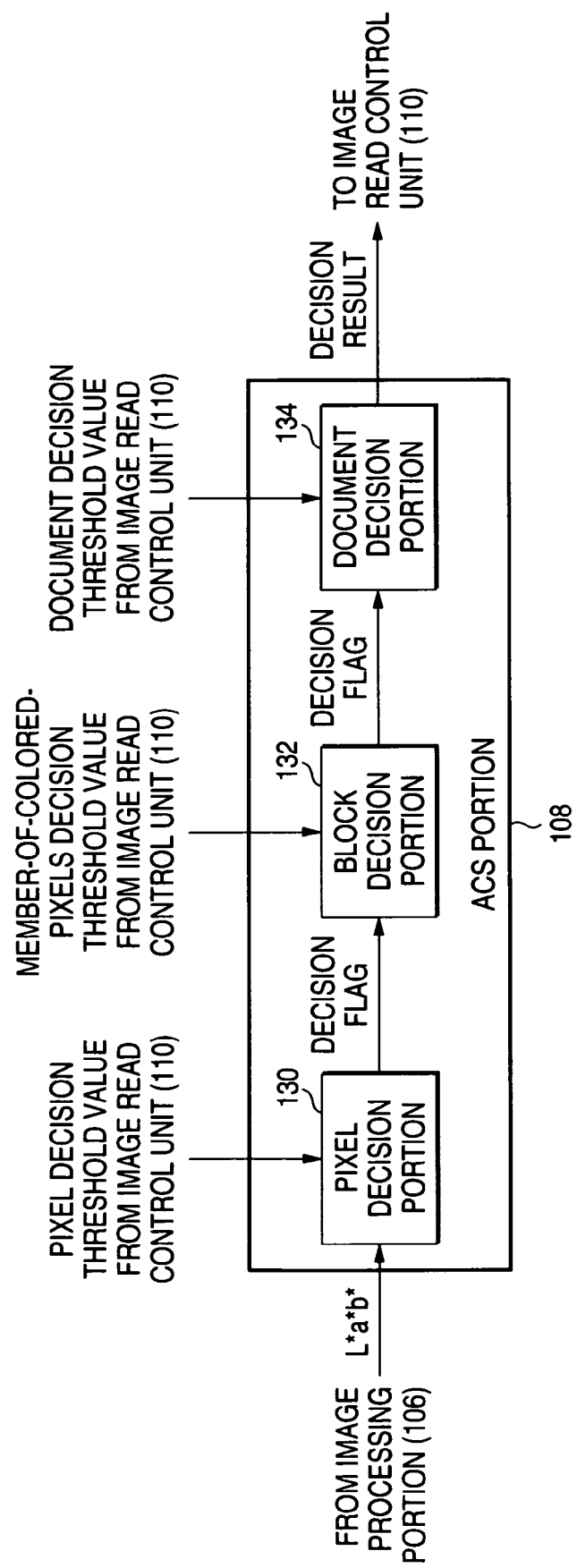
FIG. 6 is a block diagram showing a configuration of an ACS portion.

Shown in FIG. 6 is the configuration of the ACS portion 108. As shown in FIG. 6, the ACS portion 108 is configured of a pixel decision portion 130, a block decision portion 132 and a document decision portion 134.

The pixel decision portion 130 accepts the image data of the L*a*b* color representation system from the image processing portion 106 every pixel, it decides whether the pixel is colorless or colored, in accordance with the pixel decision threshold value inputted from the image read control unit 110, and it outputs the result of the decision to the block decision portion 132 as a decision flag every pixel.

FIG. 7 is a graph showing pixel decision threshold values which are used in the cases where the pixel decision portion 130 decides whether the pixel is colorless or colored.

The pixel decision portion 130 decides each pixel as being colorless, in a case where the chromaticity of the pixel lies within that region (black-and-white decision region) of an a*b* plane which is enclosed with the pixel decision threshold value, and it decides each pixel as being colored, in a case where the chromaticity lies outside the region which is enclosed with the pixel decision threshold value. Besides, when the gain value which the analog correction portion 102 changes becomes large in the case of the occurrence of the light quantity degradation or the like in the light source 88, or the like, the pixel decision portion 130 acquires from the image read control unit 110, the pixel decision threshold value which spreads the black-and-white decision region within the a*b* plane. Thus, unless a value indicating a chromaticity is larger than before the occurrence of the light quantity degradation or the like in the light source 88, the pixel is prevented from being decided as a colored one.

The block decision portion 132 (FIG. 6) accepts the decision flag from the pixel decision portion 130 every pixel, it counts the number of colored pixels which are contained in each of N×M blocks (where letters N and M denote integral numbers of pixels as predetermined) for dividing the document (or an ACS decision region to be explained later), and it decides whether the block is colorless or colored, in accordance with a number-of-colored-pixels decision threshold value inputted from the image read control unit 110. The result of the decision is outputted to the document decision portion 134 as a decision flag every block.

FIGS. 8A and 8B show the decided results of individual pixels as are inputted from the pixel decision portion 130 to the block decision portion 132, with respect to the identical block in the identical document in the case where the analog correction portion 102 changes the gain value. Here, FIG. 8A shows the decided results before the occurrence of the light quantity degradation or the like of the light source 88, while FIG. 8B shows the decided results after the occurrence of the light quantity degradation or the like of the light source 88.

As shown in FIGS. 8A and 8B, when the analog correction portion 102 enlarges the gain value on account of the light quantity degradation or the like of the light source 88, the decided results in which the number of the colored pixels increases are inputted from the pixel decision portion 130 to the block decision portion 132 with respect to the identical block in the identical document.

FIGS. 9A and 9B are model diagrams exemplifying the number-of-colored-pixels decision threshold values which are used in cases where the block decision portion 132 decides whether each block is colorless or colored. Here, FIG. 9A shows the number-of-colored-pixels decision threshold value before the occurrence of the light quantity degradation or the like of the light source 88, while FIG. 9B shows the number-of-colored-pixels decision threshold value after the occurrence of the light quantity degradation or the like of the light source 88. Regarding the block of, for example, 12 pixels×12 pixels, the block decision portion 132 acquires from the image read control unit 110, the number-of-colored-pixels decision threshold value which is enlarged (from 48 pixels to 72 pixels by way of example) in accordance with the gain value that the analog correction portion 102 changes in the case of the occurrence of the light quantity degradation or the like in the light source 88, or the like. Thus, unless the number of the colored pixels within the block is larger than before the occurrence of the light quantity degradation or the like in the light source 88, the block is prevented from being decided as a colored one.

The document decision portion 134 (FIG. 6) accepts the decision flag from the block decision portion 132 every pixel, it counts the number of colored blocks which are contained in the document (or the ACS decision region to be explained later), and it decides whether the document is colorless or colored, in accordance with a document decision threshold value inputted from the image read control unit 110. The result of the decision is outputted to the image read control unit 110.

Figure 10B:
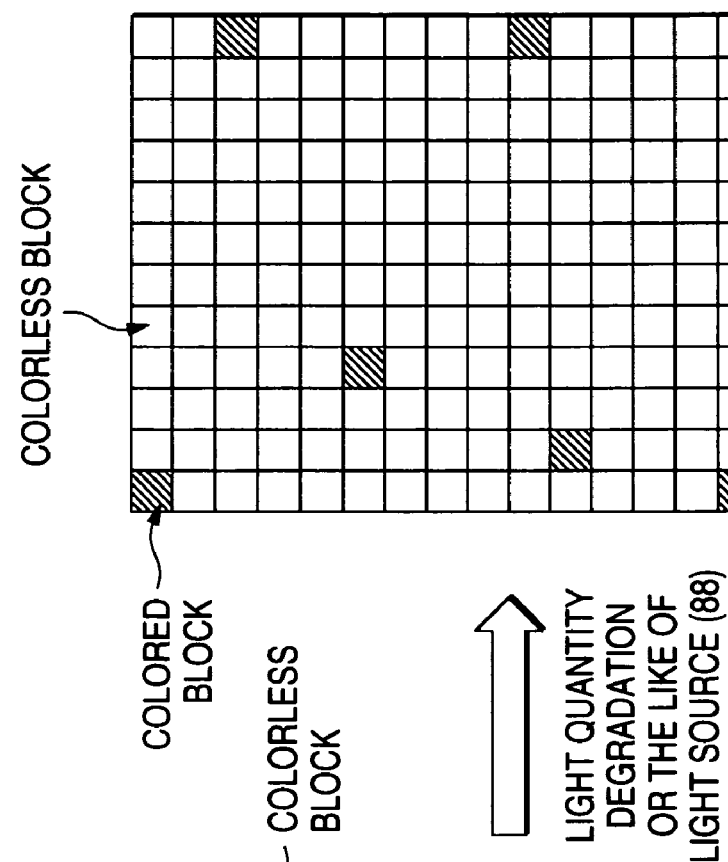
Figure 10A:
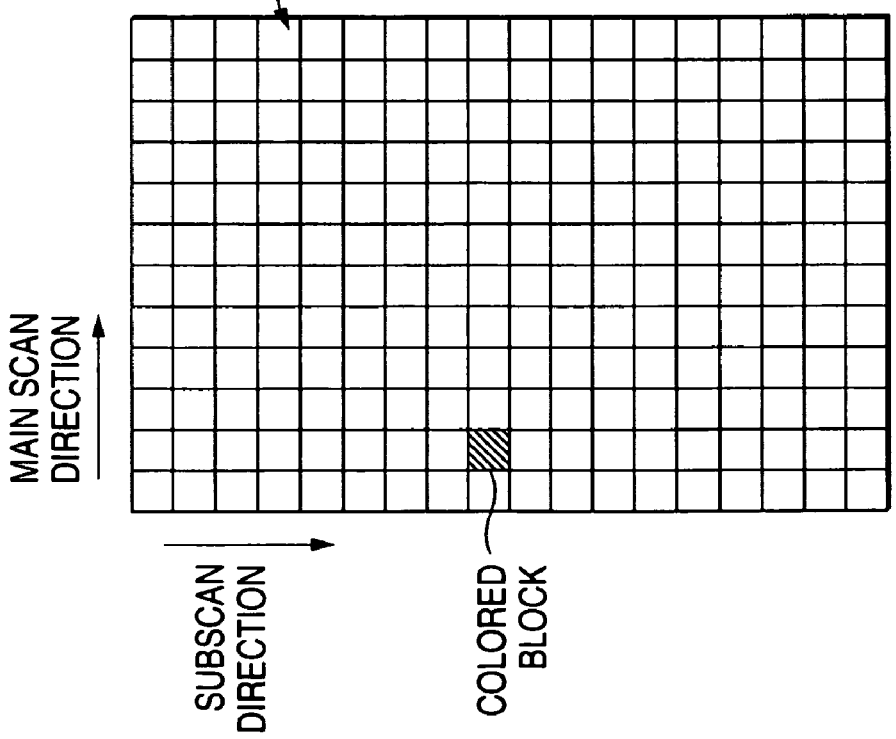

FIGS. 10A and 10B show the decided results of individual blocks as are inputted from the block decision portion 132 to the document decision portion 134, with respect to the identical document in the case where the analog correction portion 102 changes the gain value. Here, FIG. 10A shows the decided results before the occurrence of the light quantity degradation or the like of the light source 88, while FIG. 10B shows the decided results after the occurrence of the light quantity degradation or the like of the light source 88.

As shown in FIGS. 10A and 10B, when the analog correction portion 102 enlarges the gain value on account of the light quantity degradation or the like of the light source 88, the decided results in which the number of the colored blocks increases are inputted from the block decision portion 132 to the document decision portion 134 with respect to the identical document.

FIGS. 11A and 11B are model diagrams exemplifying the document decision threshold values which are used in cases where the document decision portion 134 decides whether the document is colorless or colored. Here, FIG. 11A shows the document decision threshold value before the occurrence of the light quantity degradation or the like of the light source 88, while FIG. 11B shows the document decision threshold value after the occurrence of the light quantity degradation or the like of the light source 88. Regarding the document of, for example, 216 blocks, the document decision portion 134 acquires from the image read control unit 110, the document decision threshold value which is enlarged (from 24 blocks to 32 blocks by way of example) in accordance with the gain value that the analog correction portion 102 changes in the case of the occurrence of the light quantity degradation or the like in the light source 88, or the like. Thus, unless the number of the colored pixels is larger than before the occurrence of the light quantity degradation or the like in the light source 88, the document is prevented from being decided as a colored one.

Figure 12:
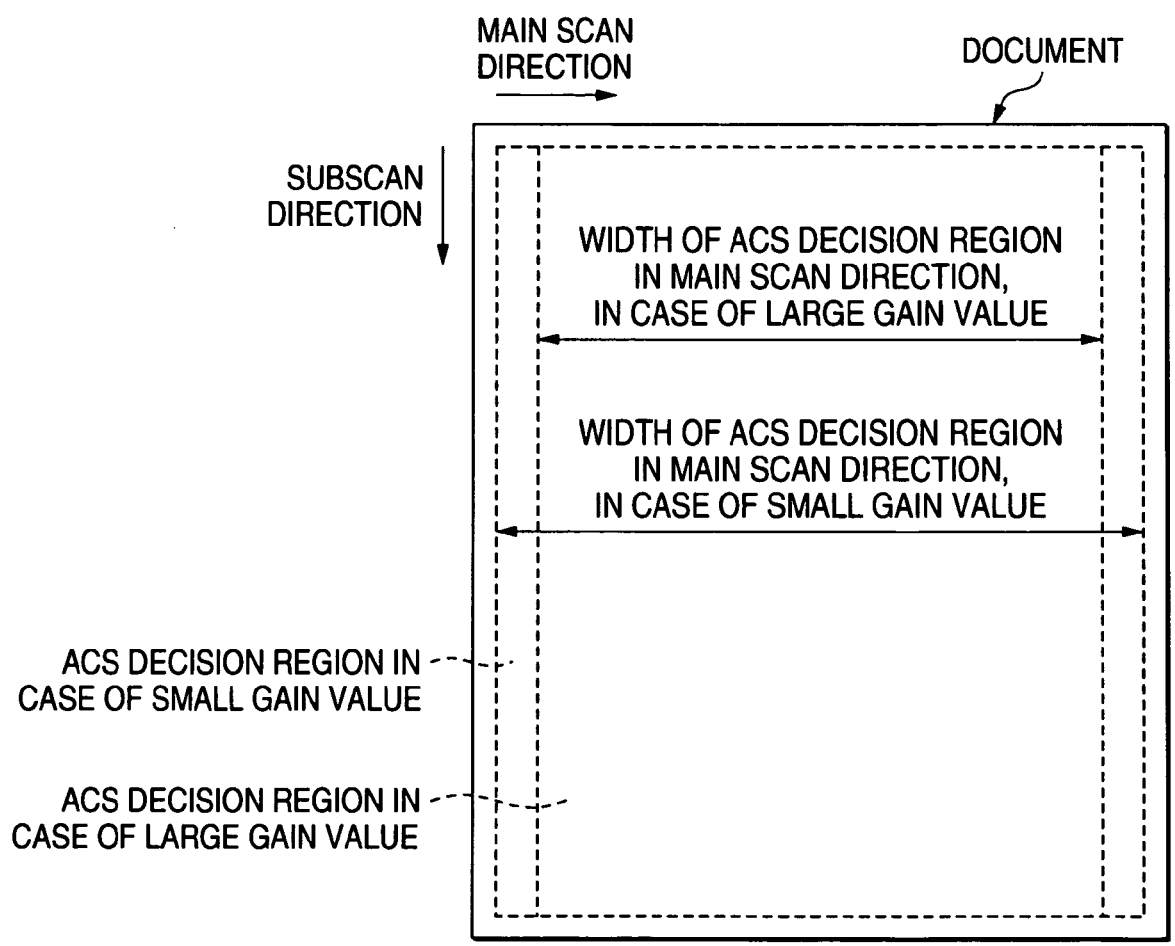
FIG. 12 is a document top view showing an ACS decision region relative to the document, in the case of varying the region (ACS decision region) in which pixels to be decided by the ACS portion lie.

FIG. 12 is a document top view showing the ACS decision region relative to the document, in the case of varying the region (ACS decision region) in which pixels to be decided by the ACS portion 108 lie.

The light source 88 exhibits the smaller light quantities at the end parts in the main scan direction, as compared with the light quantity at the middle part in the main scan direction (refer to FIG. 3). Therefore, the ACS portion 108 may well variably set the width of the ACS decision region relative to the document so as to narrow inward in the main scan direction as shown in FIG. 12, in the case where the analog correction portion 102 has enlarged the gain value.

Next, there will be described an operation in which the document reading apparatus 14 decides whether the document is colorless or colored.

Figure 13:
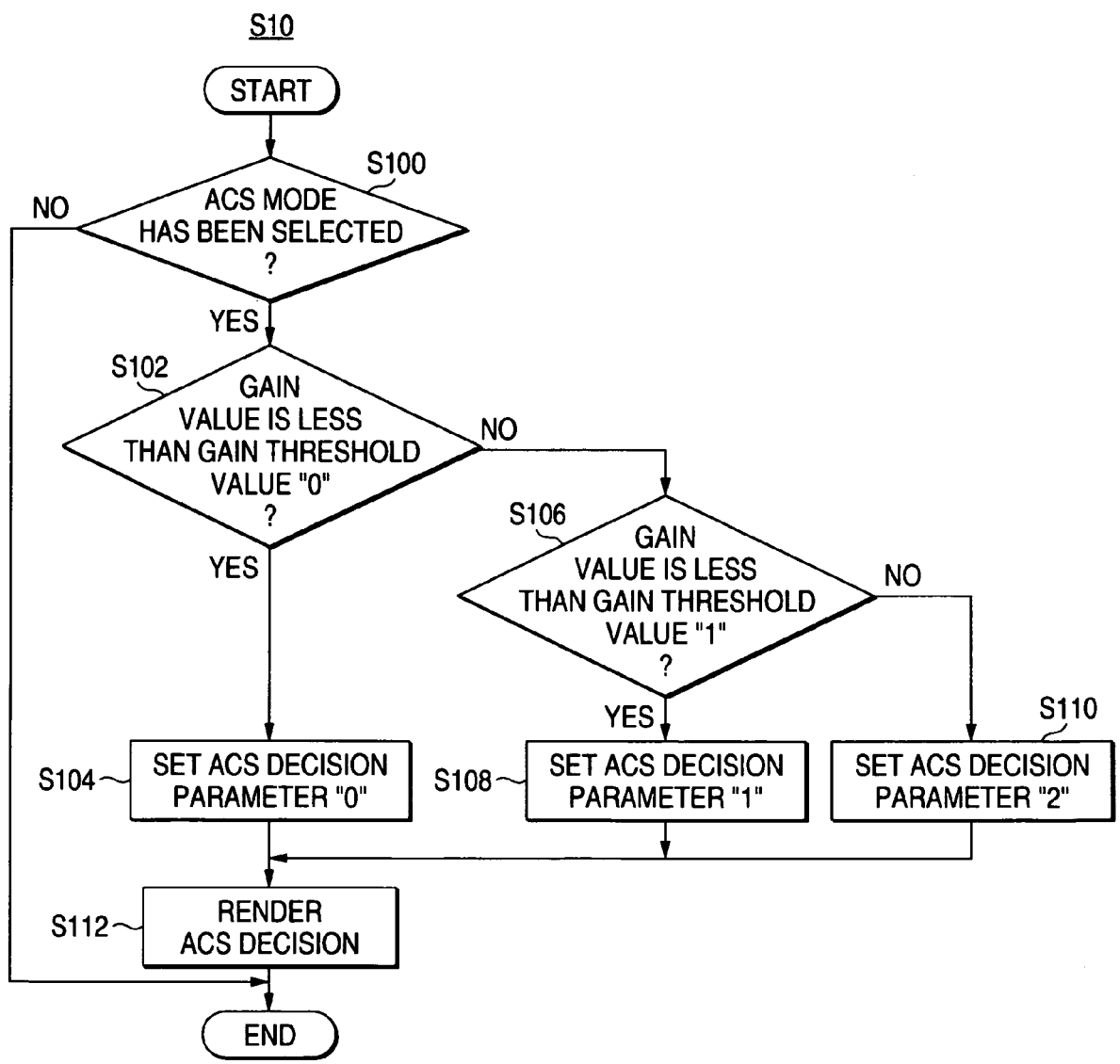
FIG. 13 is a flow chart showing a first example (S10) of an operation in which the document reading apparatus decides whether the document is colorless or colored.

FIG. 13 is a flow chart showing a first example (S10) of the operation in which the document reading apparatus 14 decides whether the document is colorless or colored.

As shown in FIG. 13, at a step 100 (S100), the image read control unit 110 decides whether or not the ACS mode has been selected by a user through the user interface not shown. Subject to the decision that the ACS mode has been selected, the routine proceeds to a step S102, and subject to the decision that the ACS mode has not been selected, the routine is ended.

At the step 102 (S102), the image read control unit 110 decides whether or not the gain value adjusted by the analog correction portion 102 is less than the gain threshold value "0". In a case where the gain value is less than the gain threshold value "0", the routine proceeds to a step S104, and in a case where the gain value is, at least, the gain threshold value "0", the routine proceeds to a step S106. Here, the gain threshold value "0" is a threshold value which is previously set in order to decide whether or not the ACS portion 108 ought to decide the document by using the ACS decision parameter "0" that is the combination of, for example, the pixel decision threshold value, the number-of-colored-pixels decision threshold value, the document decision threshold value and the ACS decision region.

At the step 104 (S104), the image read control unit 110 sets the ACS decision parameter "0" for the ACS portion 108.

At the step 106 (S106), the image read control unit 110 decides whether or not the gain value adjusted by the analog correction portion 102 is less than the gain threshold value "1". In a case where the gain value is less than the gain threshold value "1", the routine proceeds to a step S108, and in a case where the gain value is, at least, the gain threshold value "1", the routine proceeds to a step S110. Here, the gain threshold value "1" is a threshold value which is previously set in order to decide whether or not the ACS portion 108 ought to decide the document by using the ACS decision parameter "1" that is the combination of, for example, the pixel decision threshold value, the number-of-colored-pixels decision threshold value, the document decision threshold value and the ACS decision region.

Incidentally, the ACS decision parameter "1" is altered so as to bring the pixel decision threshold value onto a high chromaticity side, to bring the number-of-colored-pixels decision threshold value onto an increase side, to bring the document decision threshold value onto an increase side and to make the ACS decision region small in area, with respect to the ACS decision parameter "0", and it makes the document difficult to be decided as a colored one.

At the step 108 (S108), the image read control unit 110 sets the ACS decision parameter "1" for the ACS portion 108.

At the step 110 (S110), the image read control unit 110 sets the ACS decision parameter "2" for the ACS portion 108. Incidentally, the ACS decision parameter "2" makes the document difficult to be decided as a colored one, more than the ACS decision parameter "1".

At a step 112 (S112), the ACS portion 108 decides whether the document is colorless or colored, by using the set one of the ACS decision parameters "0"-"2".

Figure 14:
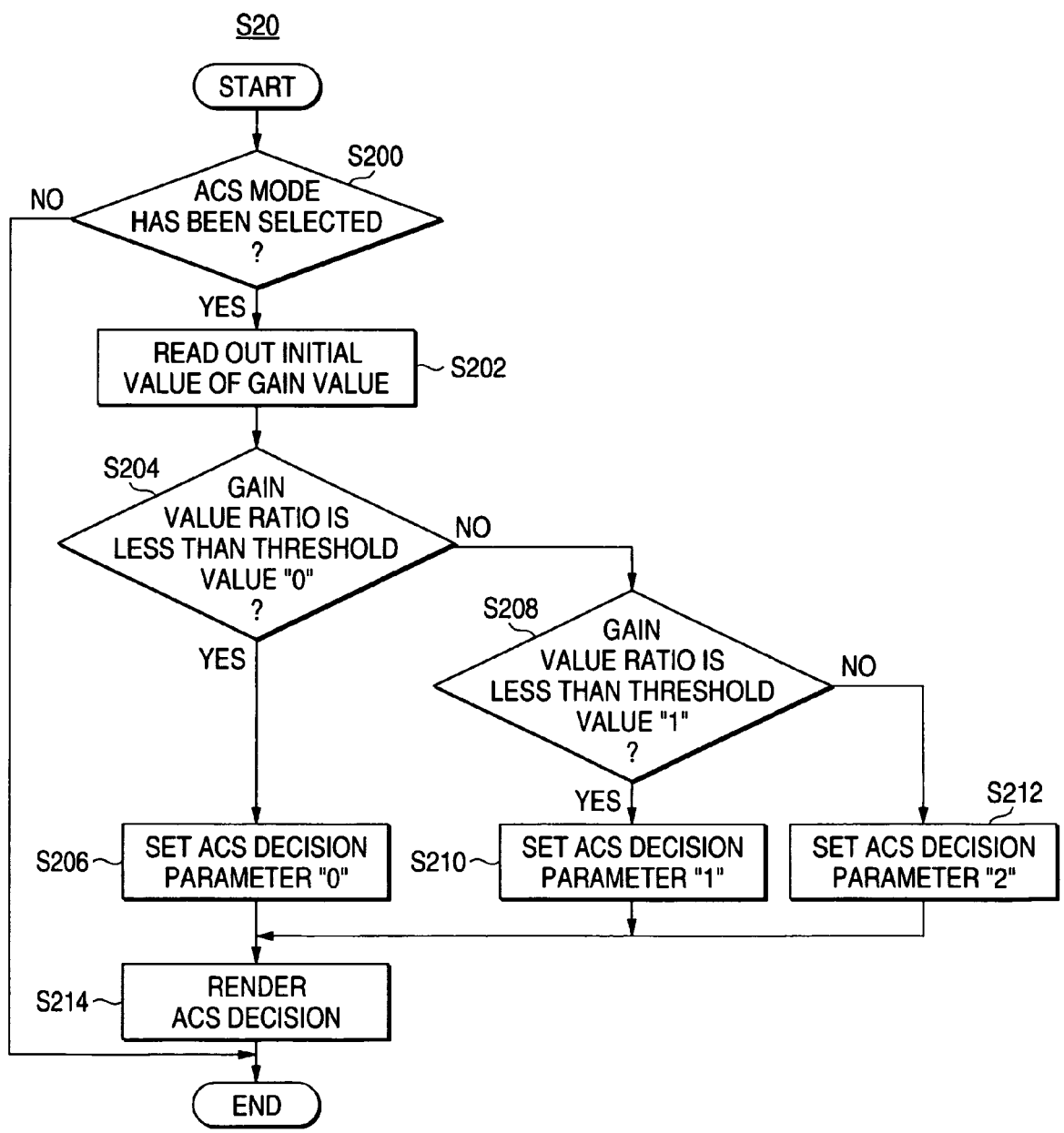
FIG. 14 is a flow chart showing a second example (S20) of the operation in which the document reading apparatus decides whether the document is colorless or colored.

FIG. 14 is a flow chart showing a second example (S20) of the operation in which the document reading apparatus 14 decides whether the document is colorless or colored.

As shown in FIG. 14, at a step 200 (S200), the image read control unit 110 decides whether or not the ACS mode has been selected by the user through the user interface not shown. Subject to the decision that the ACS mode has been selected, the routine proceeds to a step S202, and subject to the decision that the ACS mode has not been selected, the routine is ended.

At the step 202 (S202), the image read control unit 110 reads the initial value of the gain value of the analog correction portion 102 out of the NVM 124, and it stores the initial value in, for example, the RAM 122.

At a step 204 (S204), the image read control unit 110 decides whether or not the ratio of a present gain value to the initial value of the gain value of the analog correction portion 102 is less than the gain threshold value ratio "0". In a case where the ratio is less than the gain threshold value ratio "0", the routine proceeds to a step S206, and in a case where the ratio is, at least, the gain threshold value ratio "0", the routine proceeds to a step S208. Here, the gain threshold value ratio "0" is a predetermined threshold value which is previously set in order to decide whether or not the ACS portion 108 ought to decide the document by using the ACS decision parameter "0".

At the step 206 (S206), the image read control unit 110 sets the ACS decision parameter "0" for the ACS portion 108.

At the step 208 (S208), the image read control unit 110 decides whether or not the ratio of the present gain value to the initial value of the gain value of the analog correction portion 102 is less than the gain threshold value ratio "1". In a case where the ratio is less than the gain threshold value ratio "1", the routine proceeds to a step S210, and in a case where the ratio is, at least, the gain threshold value ratio "1", the routine proceeds to a step S212. Here, the gain threshold value ratio "1" is a predetermined threshold value which is previously set in order to decide whether or not the ACS portion 108 ought to decide the document by using the ACS decision parameter "1".

At the step 210 (S210), the image read control unit 110 sets the ACS decision parameter "1" for the ACS portion 108.

At the step 212 (S212), the image read control unit 110 sets the ACS decision parameter "2" for the ACS portion 108.

At a step 214 (S214), the ACS portion 108 decides whether the document is colorless or colored, by using the set one of the ACS decision parameters "0"-"2".

Figure 15:
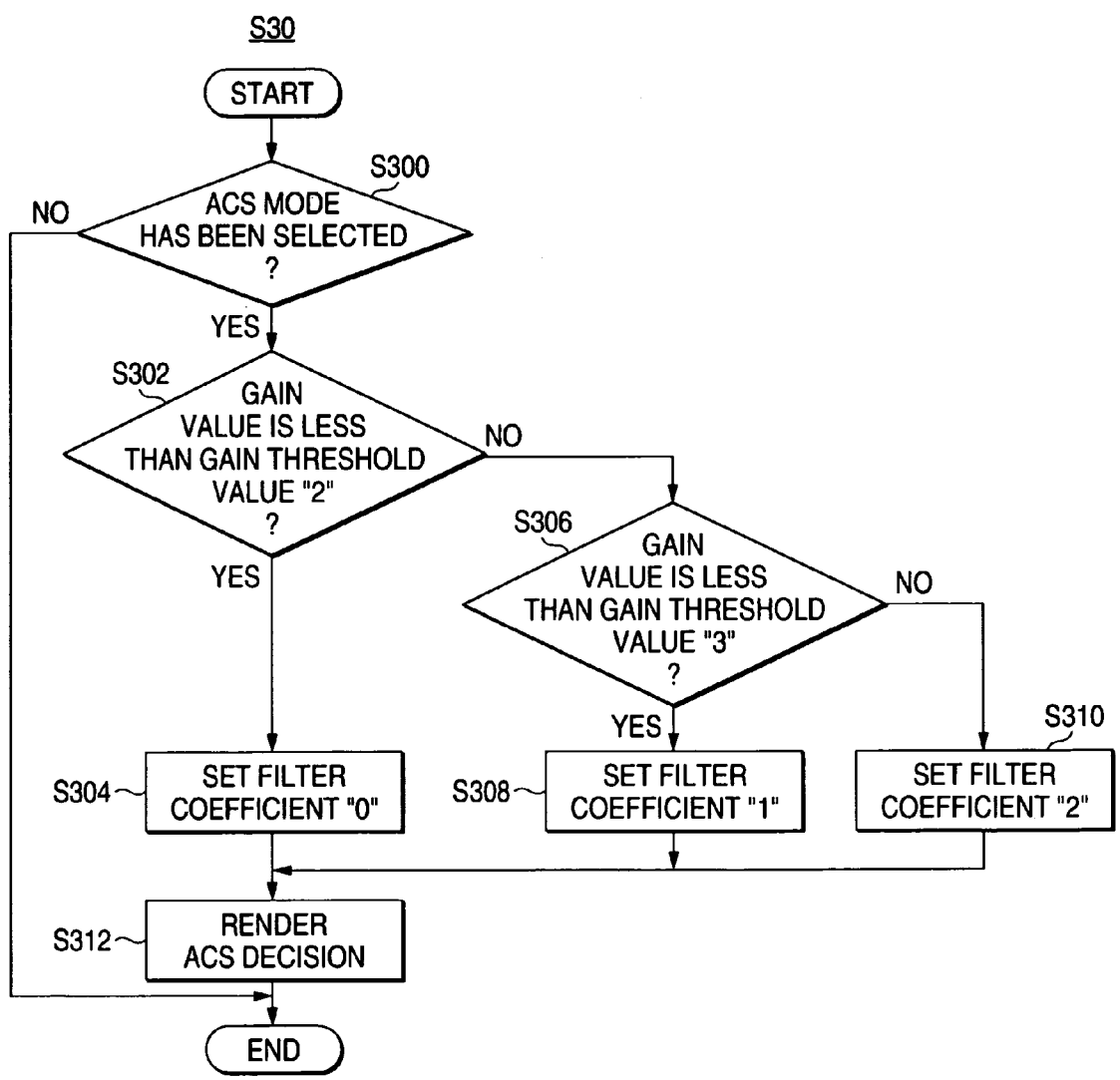
FIG. 15 is a flow chart showing a third example (S30) of the operation in which the document reading apparatus decides whether the document is colorless or colored.

FIG. 15 is a flow chart showing a third example (S30) of the operation in which the document reading apparatus 14 decides whether the document is colorless or colored.

As shown in FIG. 15, at a step 300 (S300), the image read control unit 110 decides whether or not the ACS mode has been selected by the user through the user interface not shown. Subject to the decision that the ACS mode has been selected, the routine proceeds to a step S302, and subject to the decision that the ACS mode has not been selected, the routine is ended.

At the step 302 (S302), the image read control unit 110 decides whether or not the gain value adjusted by the analog correction portion 102 is less than the gain threshold value "2". In a case where the gain value is less than the gain threshold value "2", the routine proceeds to a step S304, and in a case where the gain value is, at least, the gain threshold value "2", the routine proceeds to a step S306. Here, the gain threshold value "2" is a threshold value which is previously set in order to decide whether or not the image processing portion 106 ought to smooth RGB signals indicating an image, by using the filter coefficient "0".

Figure 16:
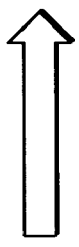
FIG. 16 is a table showing a result obtained in such a way that the number of pixels to be decided as colored ones due to noise is decreased using a filter coefficient "0"

The filter coefficient "0" is a coefficient for decreasing the number of pixels to be decided as colored ones due to noise, in such a way that, as shown in FIG. 16 by way of example, the RGB signals are respectively smoothed by 1×3 filtering (the pixel value "44" of the signal B, for example, is brought to 12×0.25+44×0.5+14×0.25≈28).

At the step 304 (S304), the image read control unit 110 sets the filter coefficient "0" for the image processing portion 106.

At the step 306 (S306), the image read control unit 110 decides whether or not the gain value adjusted by the analog correction portion 102 is less than the gain threshold value "3". In a case where the gain value is less than the gain threshold value "3", the routine proceeds to a step S308, and in a case where the gain value is, at least, the gain threshold value "3", the routine proceeds to a step S310. Here, the gain threshold value "3" is a threshold value which is previously set in order to decide whether or not the image processing portion 106 ought to smooth the RGB signals indicating the image, by using the filter coefficient "1". Incidentally, the filter coefficient "1" is a coefficient which smoothes the RGB signals more than the filter coefficient "0".

At the step 308 (S308), the image read control unit 110 sets the filter coefficient "1" for the image processing portion 106.

At the step 310 (S310), the image read control unit 110 sets the filter coefficient "2" for the image processing portion 106. Incidentally, the filter coefficient "2" is a coefficient which smoothes the RGB signals more than the filter coefficient "1".

At a step 312 (S312), the ACS portion 108 decides whether the document is colorless or colored, by using the RGB signals smoothed by the image processing portion 106.

Figure 17:
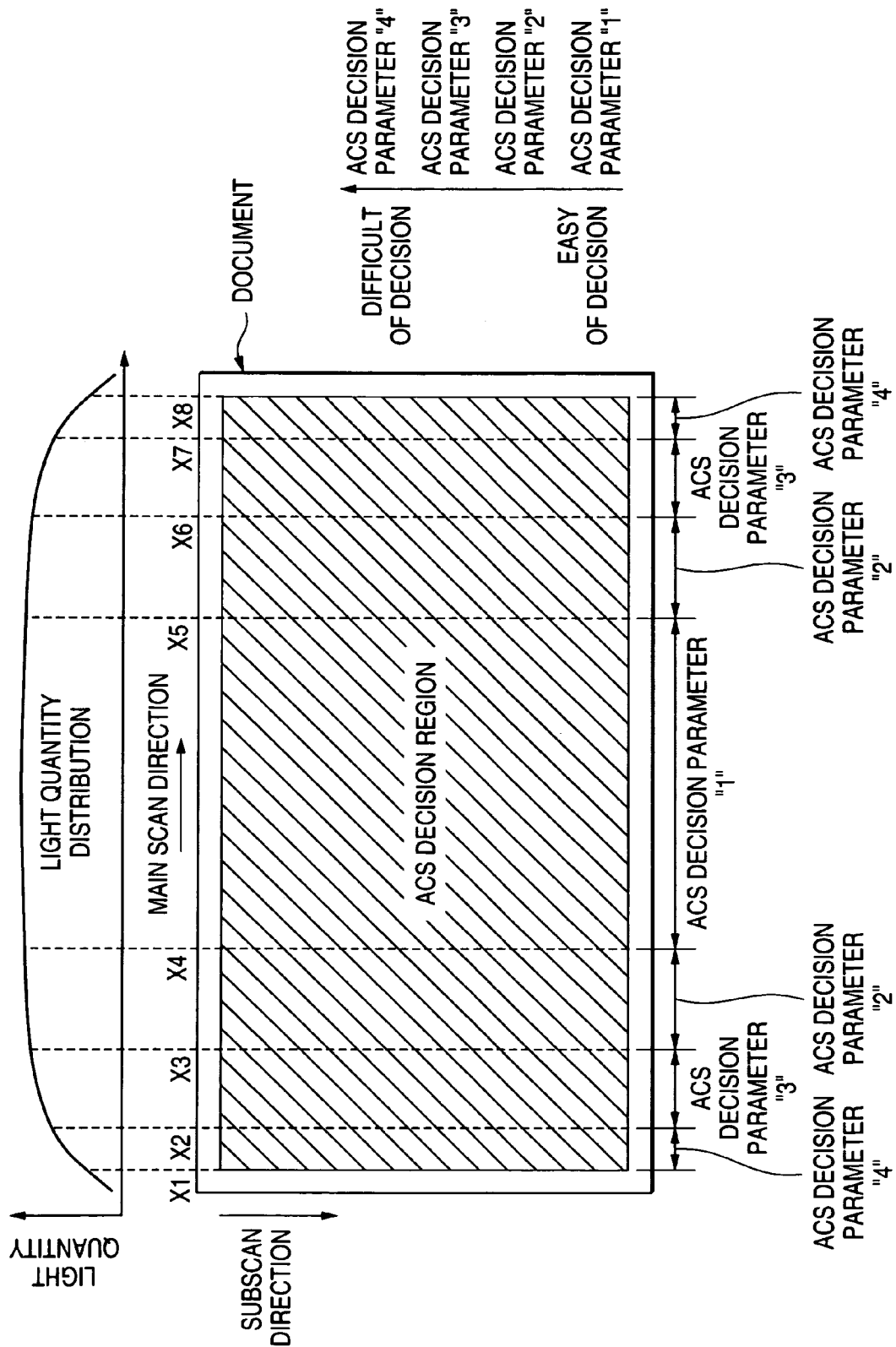
FIG. 17 is an ACS-decision-parameter setting region diagram showing a fourth example of the operation in which the document reading apparatus decides whether the document is colorless or colored.

FIG. 17 is an ACS-decision-parameter setting region diagram showing a fourth example of the operation in which the document reading apparatus 14 decides whether the document is colorless or colored.

As shown in FIG. 17, the document reading apparatus 14 may well be made capable of setting the ACS decision parameters for the respective positions (X1-X8) of the document in the main scan direction thereof, in accordance with a light quantity distribution corresponding to the respective positions (X1-X8) of the document in the main scan direction thereof. Incidentally, the ACS decision parameters "1"-"4" are set in an ascending order so that, when the document is colored, the ACS decision parameter "4" may be the most difficult of the decision.

That is, the ACS decision parameters are permitted to be set for the respective positions of the document in the main scan direction thereof, whereby the ACS decision parameters may well be set irrespective of the gain value of the analog correction portion 102 and in consideration of the light quantity distribution, a stain on the optical path of the light source 88, or the like.

Besides, the document reading apparatus 14 may have a plurality of ACS decision parameters or filter coefficients set beforehand, or it may well calculate a plurality of ACS decision parameters or filter coefficients by arithmetic operations employing a reference ACS decision parameter or filter coefficient.

Further, the respective ACS decision parameters may be ones which differ from one another in any of the pixel decision threshold value, the number-of-colored-pixels decision threshold value, the document decision threshold value and the ACS decision region, or they may well be ones which differ from one another in all of the above values and region.

Besides, the embodiments have been described by exemplifying the case where the photoelectric transducer 86 receives the reflected light from the document, but the document reading apparatus 14 may well be configured so that the photoelectric transducer 86 may receive transmitted light through the document.

Further, the photoelectric transducer 86 may be a CCD provided with complementary color filters, or the like, or it may well be a CCD provided with a dichroic filter of red and black, or the like.

According to the above-embodiments, even in a case where a difference occurs in the light quantity of a light source illuminating a document, erroneous decisions on whether the document is a color one or a colorless one can be mitigated.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document deciding apparatus comprising:
   a light source;
   a light-quantity detection unit that detects a reference light quantity based on irradiation of the light source, and respective light quantities of plural colors based on reflection from or transmission through a document;
   a control unit that, on the basis of a change of the detected reference light quantity, alters one of (i) a criterion for deciding whether the document is colorless or colored and (ii) values which corresponds to the light quantities of plural colors based on reflection from or transmission through a document,
   a decision unit that decides whether the document is colorless or colored,
   wherein,
   in case of altering the criterion, the decision unit decides on the basis of the adjusted criterion and the light quantities of plural colors based on reflection from or transmission through the document, and
   in case of altering the value, the decision unit decides on the basis of the respective altered values and a predetermined criterion for deciding whether the document is colorless or colored.

2. The document deciding apparatus according to claim 1, wherein the control unit that alters the criterion or the value, in a case where at least one of the light quantities of the plural colors detected from reference-light-quantity light by the light-quantity detection unit is smaller than a predetermined quantity.

3. A document deciding apparatus according to claim 1, wherein the decision unit has plural criteria conforming to the light quantities, for the respective light quantities of the plural colors detected from the reference-light-quantity light by the light-quantity detection unit.

4. A document deciding apparatus according to claim 1, wherein the light-quantity detection unit detects the respective light quantities by converting the respective light quantities into an electric signal.

5. A document deciding apparatus according to claim 4, further comprising:
   an amplification unit amplifying the electric signal corresponding to the light quantities, for the respective colors; and
   a gain setting unit setting a gain for the amplification unit at a predetermined timing for the respective colors so that the amplification unit can amplify to a predetermined magnitude, the electric signal which corresponds to the respective light quantities detected from the reference-light-quantity light by the light-quantity detection unit;
   wherein the control unit performs the control so as to alter the criterion of the decision unit or the value corresponding to the light quantities detected by the light-quantity detection unit, in a case where at least one of the gain set by the gain setting unit exceeds a predetermined value.

6. A document deciding apparatus according to claim 4, further comprising:
   an amplification unit amplifying the electric signal corresponding to the light quantities, for the respective colors;
   a gain setting unit setting a gain for the amplification unit at a predetermined timing for the respective colors so that the amplification unit can amplify to predetermined magnitudes, the electric signal which correspond to the respective light quantities detected from the reference-light-quantity light by the light-quantity detection unit; and a storage unit storing respective initial values of the gain which the gain setting unit sets;

wherein the control unit performs the control so as to alter the criterion of the decision unit or the value corresponding to the light quantities detected by the light-quantity detection unit, in a case where at least one of the gain set by the gain setting unit changes a predetermined magnitude relative to a corresponding one of the respective initial values of the gain stored in the storage unit.

7. A document deciding apparatus according to claim 4, further comprising:

an amplification unit amplifying the electric signal corresponding to the light quantities, for the respective colors;

a gain setting unit setting a gain for the amplification unit at a predetermined timing for the respective colors so that the amplification unit can amplify to a predetermined magnitude, the electric signal which corresponds to the respective light quantities detected from the reference-light-quantity light by the light-quantity detection unit; and an arithmetic processing portion which subjects the electric signal corresponding to the light quantities detected by the light-quantity detection unit, to predetermined arithmetic processing;

wherein the arithmetic processing portion subjects the electric signals corresponding to the respective light quantities of the plurality of colors based on the reflection from or transmission through the document detected by the light-quantity detection unit, to the predetermined arithmetic processing in accordance with the control of the control unit, in a case where at least one of the gain set by the gain setting unit exceeds a predetermined value.

8. A document deciding apparatus according to claim 7, wherein the arithmetic processing portion subjects the respective light quantities of the plurality of colors as have been detected from the reference-light-quantity light by the light-quantity detection unit, to the arithmetic processing by using plural arithmetic processing coefficients which conform to the light quantities.

9. A document deciding apparatus according to claim 7, wherein the arithmetic processing portion subjects the electric signal corresponding to the light quantities detected by the light-quantity detection unit, to filtering.

10. A document deciding apparatus according to claim 5, wherein the gain setting unit sets the gains for the amplification unit, for the respective colors at turn-ON of a power source and on the basis of a predetermined period or a number of document sheets for which the light-quantity detection unit detects the light quantities.

11. A document deciding apparatus according to claim 5, wherein the decision unit decides whether the document is colorless or colored, in such a way that the electric signal corresponding to the light quantities based on the reflection or transmission amplified by the amplification unit are compared with a predetermined threshold value.

12. A document deciding apparatus according to claim 4, wherein the light source is disposed so as to extend in one direction with respect to the document, and wherein the control unit performs the control so as to alter the criterion of the decision unit or the value corresponding to the light quantities detected by the light-quantity detection unit, in accordance with position in an extending direction of the light source.

13. A document deciding apparatus according to claim 12, wherein the decision unit has plural criteria in accordance with a position in an extending direction of the light source.

14. A document deciding apparatus according to claim 13, wherein the decision unit has plural criteria in such a manner that the criteria change successively from a position opposing to a middle part of the light source, toward a position opposing to each end part of the light source.

15. A document deciding apparatus according to claim 4, wherein the control unit performs the control so as to alter the criterion of the decision unit or the value corresponding to the light quantities detected by the light-quantity detection unit, in accordance with a distribution of the reference light quantity based on the projection by the light source.

16. A document deciding apparatus according to claim 4, wherein the control unit performs the control so as to alter the criterion of the decision unit or the value corresponding to the light quantities detected by the light-quantity detection unit, in accordance with a light quantity distribution which is previously set for light projected by the light source.

17. A document deciding apparatus according to claim 4, wherein the light-quantity detection unit comprises plural photodiodes which detect the light quantities of the plurality of colors, respectively, and wherein the decision unit decides whether the document is colorless or colored, on the basis of a result of decision on whether individual pixels whose light quantities are detected by the respective photodiodes are colorless or colored.

18. A document deciding apparatus according to claim 17, wherein the decision unit decides whether the document is colorless or colored, on the basis of a result of decisions on whether individual groups each comprising plural pixels are colorless or colored.

19. A document deciding apparatus according to claim 18, wherein the decision unit decides whether the document is colorless or colored, on the basis of a result of decision on whether individual blocks each comprising plural pixels are colorless or colored.

20. A document reading apparatus comprising:

a light source;

a color CCD which detects a reference light quantity based on irradiation of the light source, and respective light quantities of plural colors based on reflection from or transmission through a document;

a control unit that, on the basis of a chance of the detected reference light quantity, alters one of (i) a criterion for deciding whether the document is colorless or colored and (ii) values which corresponds to the light quantities of plural colors based on reflection from or transmission through a document, a decision unit that decides whether the document is colorless or colored, wherein, in case of altering the criterion, the decision unit decides on the basis of the adjusted criterion and the light quantities of plural colors based on reflection from or transmission through the document, and in case of altering the value, the decision unit decides on the basis of the respective altered values and a predetermined criterion for deciding whether the document is colorless or colored.

21. An image forming apparatus comprising:

a light source;

a light-quantity detection unit detecting a reference light quantity based on irradiation by the light source, and respective light quantities of plural colors based on reflection from or transmission through a document;

a control unit that, on the basis of a change of the detected reference light quantity, alters one of (i) a criterion tor deciding whether the document is colorless or colored and (ii) values which corresponds to the light quantities of plural colors based on reflection from or transmission through a document;

a decision unit that decides whether the document is colorless or colored, wherein, in case of altering the criterion, the decision unit decides on the basis of the adjusted criterion and the light quantities of plural colors based on reflection from or transmission through the document, and in case of altering the value, the decision unit decides on the basis of the respective altered values and a predetermined criterion for deciding whether the document is colorless or colored; and an image formation section forming a colorless image or an image containing a chromatic color;

wherein the image formation section forms either one of the colorless image and the image comprising the chromatic color, in accordance with a result of the decision of the decision unit.

22. A document deciding method comprising:

detecting a reference light quantity based on irradiation by a light source, and respective light quantities of plural colors based on reflection from or transmission through a document;

adjusting a criterion for deciding whether the document is colorless or colored, on the basis of a change of the reference light quantity; and deciding whether the document is colorless or colored, on the basis of the adjusted criterion and the light quantities of the plural colors based on a reflection from or transmission through the document.

23. A document deciding method comprising:

detecting a reference light quantity based on projection by a light source, and respective light quantities of plural colors based on reflection from or transmission through a document;

altering a value which corresponds to the light quantities of plural colors based on a reflection from or transmission through the document, on the basis of a change of the reference light quantity; and deciding whether the document is colorless or colored, on the basis of the respective altered values and a predetermined criterion for deciding whether the document is colorless or colored.

* * * * *